US010634000B2

(12) United States Patent
Skertic et al.

(10) Patent No.: US 10,634,000 B2
(45) Date of Patent: Apr. 28, 2020

(54) METHOD AND CONFIGURATION FOR IMPROVED VARIABLE VANE POSITIONING

(71) Applicant: Rolls-Royce North American Technologies Inc., Indianapolis, IN (US)

(72) Inventors: Richard J. Skertic, Carmel, IN (US); Matthew J. Starr, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 329 days.

(21) Appl. No.: 15/631,984

(22) Filed: Jun. 23, 2017

(65) Prior Publication Data

US 2018/0371938 A1 Dec. 27, 2018

(51) Int. Cl.
*F01D 17/16* (2006.01)
*F01D 17/20* (2006.01)
*F04D 29/54* (2006.01)

(52) U.S. Cl.
CPC .......... *F01D 17/162* (2013.01); *F01D 17/16* (2013.01); *F01D 17/20* (2013.01); *F04D 29/54* (2013.01); *F05D 2220/40* (2013.01); *F05D 2250/71* (2013.01); *F05D 2270/58* (2013.01)

(58) Field of Classification Search
CPC ......... F01D 17/16; F01D 17/162; F01D 17/20
See application file for complete search history.

(56) References Cited

U.S. PATENT DOCUMENTS

| 3,685,920 | A | | 8/1972 | Burge | |
|---|---|---|---|---|---|
| 4,120,479 | A | * | 10/1978 | Thompson | F16K 31/122 251/229 |
| 4,252,498 | A | | 2/1981 | Radcliffe et al. | |
| 4,604,030 | A | | 8/1986 | Naudet | |
| 4,767,264 | A | | 8/1988 | Kisling et al. | |
| 4,780,171 | A | * | 10/1988 | Byerley | B29D 30/26 156/417 |
| 5,024,580 | A | | 6/1991 | Olive | |
| 5,044,879 | A | | 9/1991 | Farrar | |
| 5,549,448 | A | | 8/1996 | Langston | |
| 6,666,129 | B1 | * | 12/2003 | Schmid | F15B 15/068 92/13.6 |

(Continued)

FOREIGN PATENT DOCUMENTS

| EP | 0 909 880 A2 | 4/1999 |
|---|---|---|
| EP | 2 808 495 A1 | 12/2014 |

OTHER PUBLICATIONS

Extended European Search Report for European Application No. EP18173950.9, dated Dec. 20, 2018 (7 pages).

*Primary Examiner* — Sizo B Vilakazi
*Assistant Examiner* — Anthony L Bacon
(74) *Attorney, Agent, or Firm* — McCracken & Gillen LLC (57) ABSTRACT

According to one aspect, an apparatus for controlling a vane comprises an actuator, a vane control rod, a guide pin disposed on the vane control rod, a sleeve disposed about the vane control rod, and at least one sleeve track disposed along an extent of the sleeve. Further in accordance with this aspect, the guide pin couples the vane control rod and the sleeve, and the actuator linearly moves the vane control rod through the sleeve in order to manipulate a position of the vane.

18 Claims, 5 Drawing Sheets

(56) References Cited

U.S. PATENT DOCUMENTS

| | | | |
|---|---|---|---|
| 6,769,868 B2 | 8/2004 | Harrold | |
| 6,793,194 B1* | 9/2004 | Grinberg | F15B 15/068 |
| | | | 251/263 |
| 7,588,415 B2 | 9/2009 | Giaimo et al. | |
| 7,922,445 B1 | 4/2011 | Pankey et al. | |
| 8,172,517 B2* | 5/2012 | Lighty | F01D 17/162 |
| | | | 415/156 |
| 8,740,547 B2* | 6/2014 | Colotte | F01D 17/16 |
| | | | 415/149.4 |
| 9,822,709 B2* | 11/2017 | Broman | F16K 31/5284 |
| 2011/0182716 A1* | 7/2011 | Bouru | F01D 17/16 |
| | | | 415/148 |
| 2011/0229310 A1* | 9/2011 | Colotte | F01D 17/16 |
| | | | 415/149.4 |
| 2016/0365830 A1* | 12/2016 | Bailey | H02S 20/32 |

* cited by examiner

METHOD AND CONFIGURATION FOR IMPROVED VARIABLE VANE POSITIONING

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to engines, and more particularly, to variable pitch stator vane positioning systems for varying geometry in, for example an axial flow compressor or a variable turbine of an engine.

BACKGROUND

Turbofan engines are frequently employed in aviation. A common feature of modern turbofan engines is an arrangement for varying the angles of vanes throughout. Conventionally, there are at least two general methods and/or systems for controlling variable pitch vane stators. First, all variable stator vanes of a single stage are coupled to a unison/synchronization ring, for example by a lever, and the unison/synchronization ring may then be linked to a torque tube such that the number of actuators needed to manipulate all stators for a single compression stage is decreased or minimized. According to a second alternative, all variable stator vanes of a single stage are again coupled to a unison/synchronization ring by a lever, or another suitable coupling, and a cam plate driven by one or more actuators is attached to the unison/synchronization ring in order to effectuate rotation of the variable vane stators as a result of the actuated movement.

Both conventional methods and/or systems face challenges in achieving accurate positioning of the variable stator vanes. Generally, a turbofan engine subsystem arrangement for controlling variable stator vanes is constrained by manufacturing tolerances, variation in assemble, setup and/or initialization effects, thermal effects, synchronization of multiple actuators, unison/synchronization ring deflection, and scheduling effects. All of these constraints contribute to the cumulative accuracy tolerance of the subsystem controlling the position of the variable stator vanes. Accordingly, there exists a need in the field of engine control, specifically control of axial compressors found in turbofan engines, for the subject matter of the below disclosure that increases the relative accuracy with which variable vane stators may be positioned. While this disclosure uses a turbofan engine as an exemplary embodiment, the subject matter therein is not limited to use with axial compressors or turbofan engines, but instead may be applied more broadly to the field of engine control.

Under the ideal operating conditions, conventional axial flow compressors having variable pitch stator vanes function such that all the stages of variable stator vanes are operating at a desirable, possibly maximum, efficiency and each stage of stator vanes has a surge margin. When the turbofan engine, and therefore the rotor of each compressor, is operating at rotational speeds lower than the ideal rotational speed of the compressor rotor it is beneficial to vary the angles of the stator vanes to prevent surge or stall of the compressor. However, manipulation of the angles of the stator vanes according to conventional methods may exacerbate any encountered surge or stall.

Figure 1:
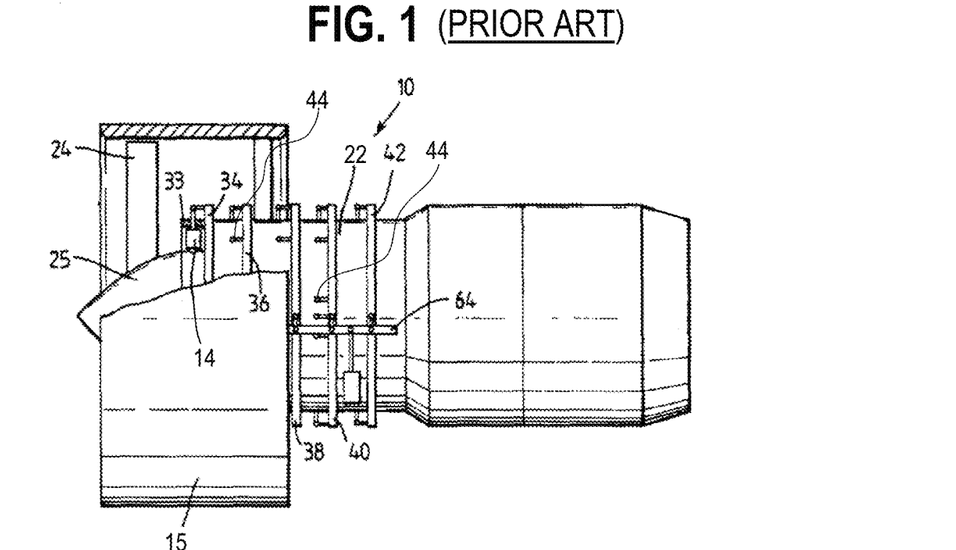
FIG. 1 shows a partially cut away view of a turbofan gas turbine engine having a variable stator vane arrangement for an axial flow compressor according to the prior art.

A turbofan gas turbine engine 10 is shown in FIG. 1 and comprises a fan assembly 15 and a compressor assembly 22. The fan assembly 15 comprises a plurality of fan blades 24 secured to and extending radially from a fan rotor 25. The fan blades 24 and fan rotor 25 are enclosed by a fan casing 26. The compressor assembly 22 includes alternating rotor blades stages and stator vane stages (FIG. 3) disposed along an axis of the turbofan engine 10. In the illustrated example, there are five stages of variable pitch stator vanes. Each of the stages of variable stator vanes comprises a plurality of circumferentially arranged radially extending stator vanes 14. The stator vanes 14 are mounted for rotation about their longitudinal axis within a compressor casing 33. A plurality of control/synchronization rings 34, 36, 38, 40, and 42 are arranged substantially coaxial with the compressor assembly 22, and around the stator casing 33. The variable pitch stator vanes 14 at each stage are connected to the associated one of the plurality of control/synchronization rings 34, 36, 38, 40, and 42 by levers 44 which are shown more clearly in FIG. 2.

Figure 2:
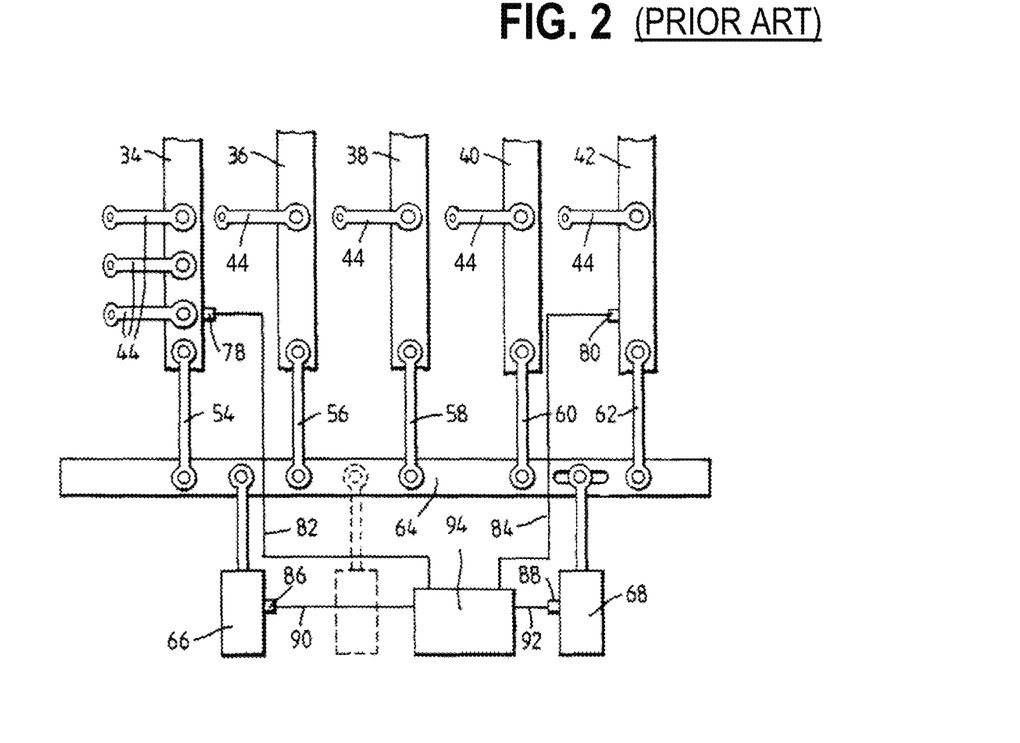
FIG. 2 shows an enlarged view of a part of the variable stator vane arrangement shown in FIG. 1.

Referring now to FIGS. 1 and 2, each of the control/synchronization rings 34, 36, 38, 40, and 42 is connected to an axial control beam 64 by operating links 54, 56, 58, 60, and 62, respectively. The operating links 54, 56, 58, 60, and 62 extend substantially tangentially with respect to their associated control/synchronization rings 34, 36, 38, 40, and 42, and the axial control beam 64 is arranged substantially perpendicular to the control/synchronization rings 34, 36, 38, 40, and 42. One or more actuators, such as first and second hydraulic actuators 66, 68 are provided to move the axially extending member 64. The first and second hydraulic actuators 66, 68 are connected to the axial control beam 64 and spaced therealong.

One or more position detector(s) or other sensor(s) 78, 80 are located on one or more associated control rings 34, 42. The position detectors/sensors 78, 80 detect the pitch or angle setting of the vanes and are arranged to produce electrical signals that are transmitted to a controller 94 via cables 82, 84. Alternatively to, or in combination with, the one or more position detector(s)/sensor(s) 78, 80, one or more position detector(s)/sensor(s) 86, 88 may be located on the hydraulic actuators 66, 68. The position detectors/sensors 86, 88 detect the position of the pistons in the hydraulic actuators 66, 68, and are arranged to produce electrical signals that are transmitted to the controller 94 via cables 90, 92.

The controller 94 uses the feedback from the position detectors/sensors to determine the position of the pitch of the vanes 14 in each variable vane stator stage and to determine the position of the pistons in the hydraulic actuators 66, 68. The controller 94 may determine necessary adjustment to the stages of variable stator vanes in order to match the engine parameters with the desired characteristics/outputs of the engine, and the controller 94 controls the flow of hydraulic fluid to the hydraulic actuators 66, 68.

In operation the axial control beam 64 is moved in a plane substantially tangential to the control rings 34, 36, 38, 40, and 42 to rotate the control rings coaxially of the compressor such that the pitch of the variable stator vanes 14 in the variable vane stator stages is manipulated. The hydraulic actuators 66, 68 may be moved in unison in the same direction such that there is a proportional movement of the variable stator vanes 14 in each stage, or, alternatively, may be moved non-matching distances such that there is a non-proportional movement of the variable stator vanes 14 across different stages.

Figure 3:
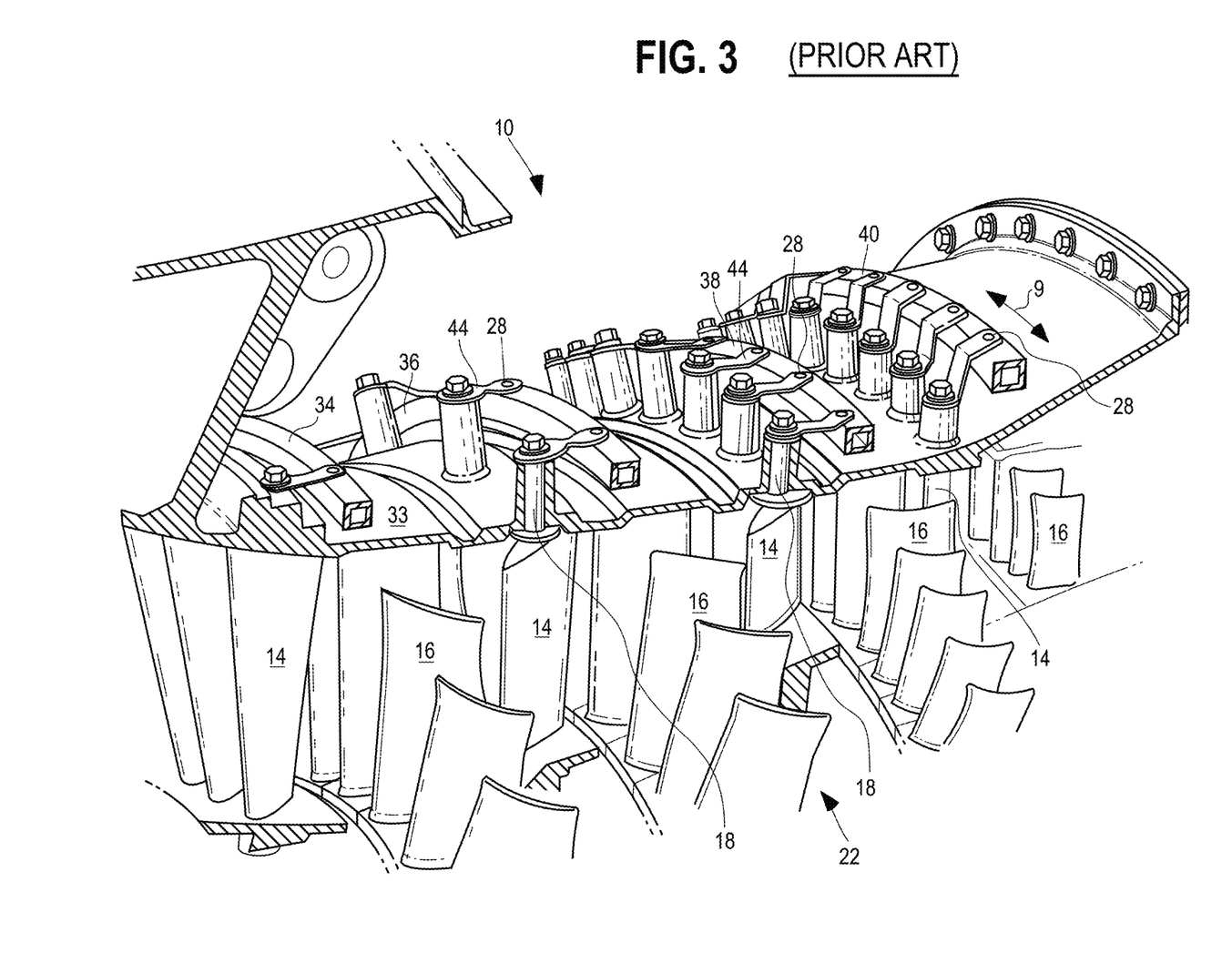
FIG. 3 shows a cut-away side view of a part of a compressor section of a turbofan gas turbine engine having a variable stator vane arrangement according to the prior art.

In FIG. 3 the compressor assembly 22 of a turbofan engine 10 is shown. Within the compressor casing 33 of the compressor assembly 22 are mounted plural stages of variable stator vanes 14 circumferentially about the central axis of the compressor assembly 22. A corresponding set of rotor blades 16 is mounted downstream of each set of stator vanes 14. Each stator vane 14 terminates at the casing 33 in a stem 18 rotatable in a bush bearing 20 on the outside of the casing wherein the end of the stem extends beyond the bush.

Located externally of the casing 33 and adjacent each set of stator vanes 14 are control/synchronization rings 34, 36, 38, 40 (control/synchronization ring 42 is not shown in FIG. 3) extending circumferentially round the compressor casing 33. For each variable stator vane 14 in a stage, the vane is connected to a corresponding control/synchronization ring 34, 36, 38, 40, 42 by a plurality of levers 44. One end of each lever 44 is clamped to the end of the variable stator vane 18 by a bolt so that there is no relative movement between the vane 14 and the lever 44. The other end of the lever 44 is connected to the control/synchronization rings 34, 36, 38, 40, 42 by a pin 28 rotatable in a bush bearing located within the respective ring.

The control/synchronization rings 34, 36, 38, 40, 42 are arranged so that each ring may be rotated about the central axis of the compressor assembly 22, i.e. in either direction of arrow 9. Consequently, rotation of each control/synchronization ring(s) 34, 36, 38, 40, 42 will, by means of the levers 44, cause rotation of each variable stator vane 14 about its own axis and thus enable the vanes 14 to assume required angles of incidence to incoming air.

A disadvantage of the geometry of this arrangement is that, as the control/synchronization rings 34, 36, 38, 40, 42 rotate, there is a tendency for each lever 44 to rotate about its longitudinal axis and, because of its stiffness, to loosen the retaining bolt. It is further necessary for the levers 44 to resist surge loads in the engine. Until now these problems have been solved by providing forged vane levers 44. However, these are costly, need extensive machining, and generate a weight penalty.

It is therefore desirable to provide a variable stator vane positioning system and device that provides improvements in accuracy, cost, replacement time and expense for stator vanes and the vane positioning system itself, and overall variable vane stator control.

SUMMARY

According to one aspect, an apparatus for controlling a vane comprises an actuator, a vane control rod, a guide pin disposed on the vane control rod, a sleeve disposed about the vane control rod, and at least one sleeve track disposed along an extent of the sleeve. Further in accordance with this aspect, the guide pin couples the vane control rod and the sleeve, and the actuator linearly moves the vane control rod through the sleeve in order to manipulate a position of the vane.

According to another aspect, a system for controlling a stator comprises a variable stator vane positioning device having an actuator, a vane control rod, and a sleeve disposed about the vane control rod. The vane control rod of this system is coupled to the sleeve, and the actuator moves the vane control rod through the sleeve in order to control a stator vane associated with the respective variable stator vane positioning device. Further according to this aspect, a plurality of variable stator vane positioning devices are disposed about a stator wherein each stator vane is individually controlled by the associated variable stator vane positioning device.

According to yet another aspect, a system for controlling a compressor comprises a plurality of variable stator vane positioning modules wherein each module comprises an actuator, a vane control rod, and a sleeve disposed about the vane control rod. Further in accordance with this aspect the sleeve has one or more sleeve tracks disposed therealong, and the vane control rod is coupled to the sleeve by a pin extending through both the vane control rod and the one or more sleeve tracks so that the sleeve rotates about the vane control rod in response to actuation of the vane control rod. This system also includes a plurality of variable stator vane positioning modules disposed about each stator of a plurality of stators wherein stator characteristics are determined by each of the variable stator vane positioning modules changing a position of a stator vane coupled thereto, and compressor operation is controlled by the combined stator characteristics of the plurality of stators.

Other aspects and advantages will become apparent upon consideration of the following detailed description and the attached drawings wherein like numerals designate like structures throughout the specification.

DETAILED DESCRIPTION

Figure 4:
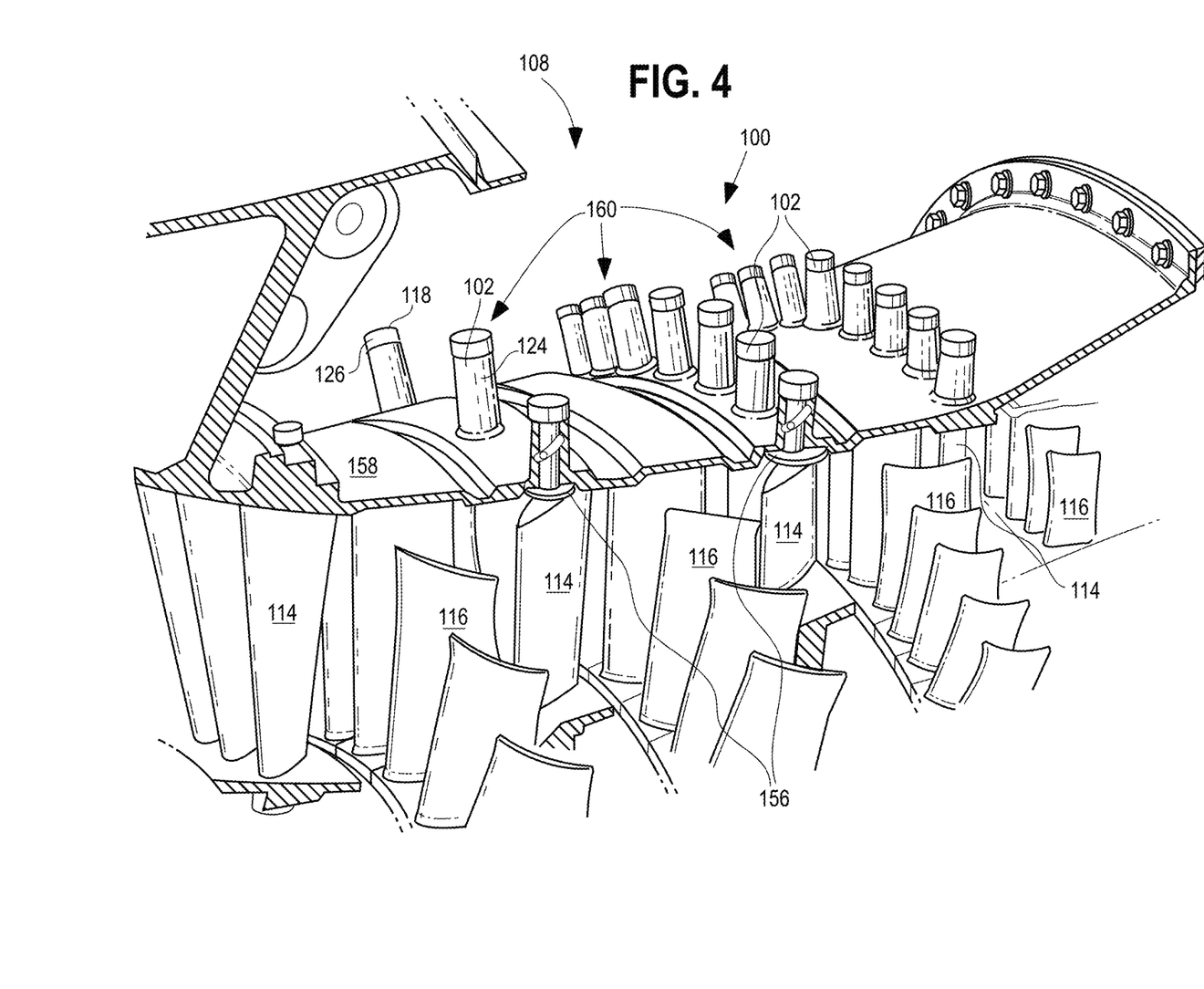
FIG. 4 shows a partially cut away view of a turbofan gas turbine engine having the variable stator vane positioning system.
Figure 5:
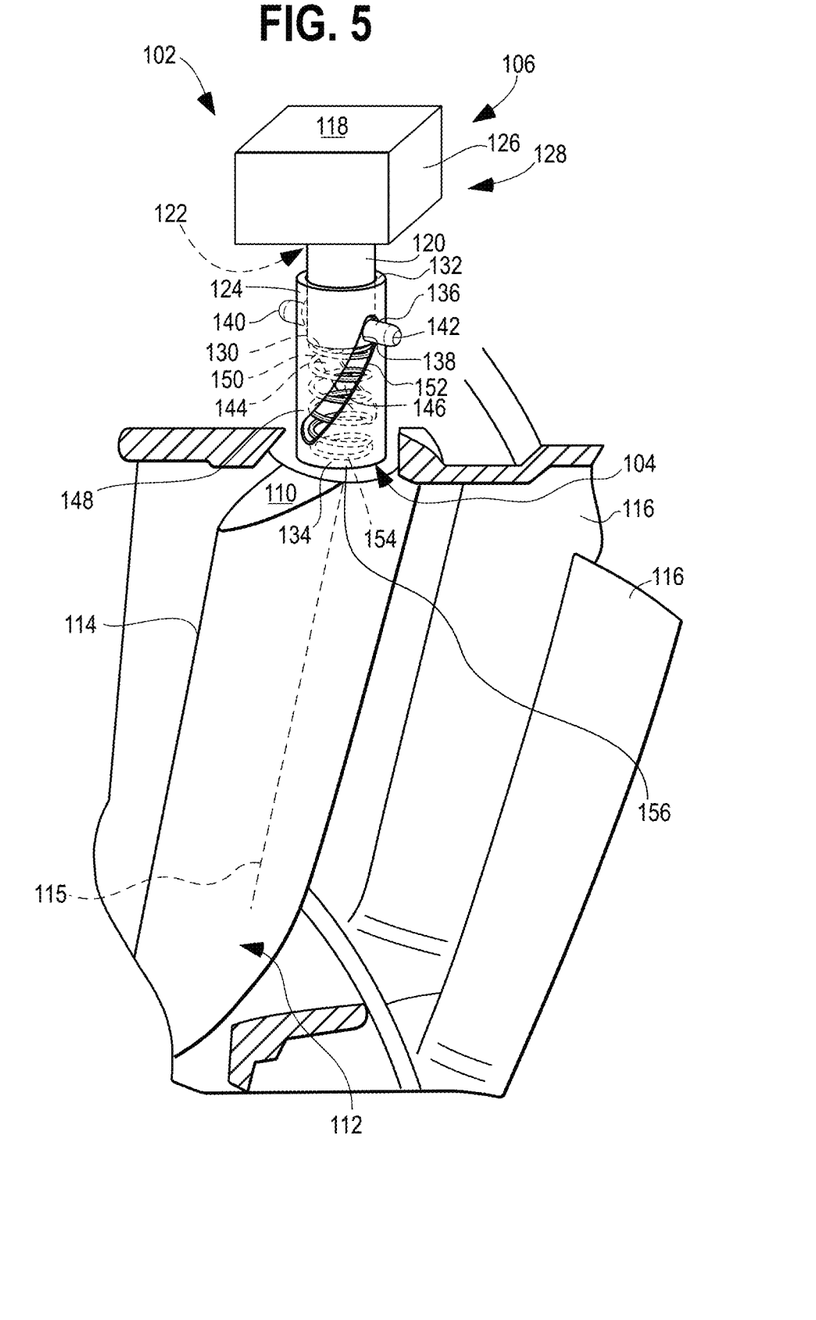
FIG. 5 shows an enlarged view of an example embodiment of a variable stator vane positioning device for a single stator.

Referring now to FIGS. 4 and 5, a variable vane positioning system 100 and a variable stator vane positioning device/module 102 forming a part of the variable vane stator positioning system 100 are respectively shown. Similar to the turbofan engine described hereinabove concerning the prior art, a turbofan engine 108 of the illustrated example embodiment includes axially alternating stages of variable stator vanes 114 and rotor blades 116.

The variable stator vane positioning device/module 102 of the variable vane positioning system 100 has a first end 104 disposed towards an interior of the turbofan engine 108 (FIG. 4) and a second end 106 disposed opposite the first end 104. The first end 104 of the stator positioning system 100 is coupled to a first end 110 of a stator 114 while a second end 112 of the stator 114 is secured in a rotatable fashion to a fixed shaft. Thus, the variable vane stator 114 may be individually rotated/manipulated about an axis 115 thereof transverse to the rotational axis of the fan shaft of the turbofan engine 108.

Referring still to FIG. 5, the second end 106 of the variable stator vane positioning device 102 comprises an actuator 118. The actuator may be a pneumatic actuator, a hydraulic actuator, piezoelectric actuator, an electric actuator, or any other suitable actuator. Alternatively, the actuator 118, if electric, may be a linear variable differential transformer (LVDT), a travelling nut linear actuator, a travelling screw linear actuator, electric stepper actuator, or another suitable electric actuator. In the further alternative, the actuator may be a hydro-mechanical servo valve or an electrical solenoid motor. An example embodiment may utilize a hydraulic actuator because it may be desirable to hydraulically lock the actuator 118 in place as well as hydraulically synchronize the actuator(s) 118 of one or more of the variable stator vane positioning device(s)/module(s) 102.

Figure 6:
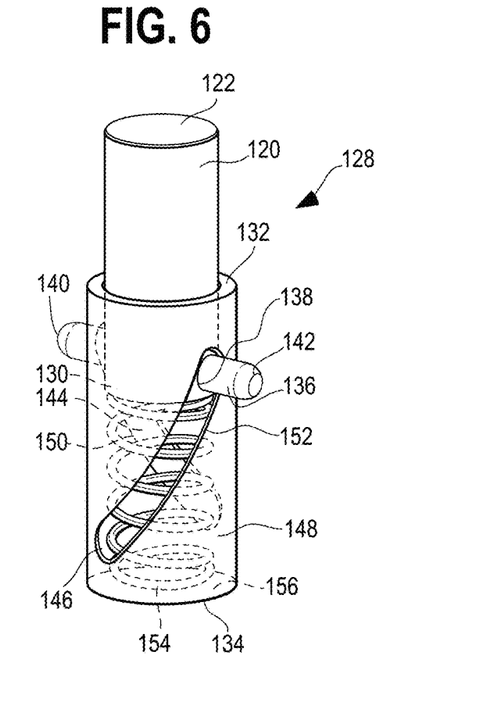
FIG. 6 shows an isometric view from above of a portion of the variable stator vane positioning device of FIG. 5 in a starting position and with a transparent housing.
Figure 7:
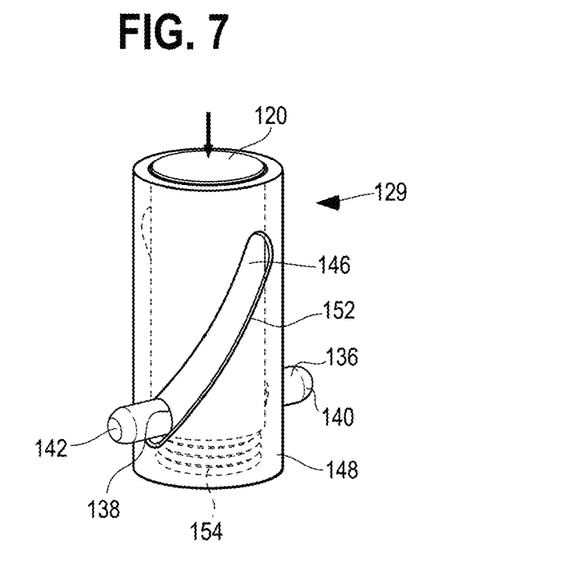
FIG. 7 shows an isometric, rotated view from above of a portion of the variable stator vane positioning device of FIG. 5 in an extended position and with a transparent housing.
Figure 8:
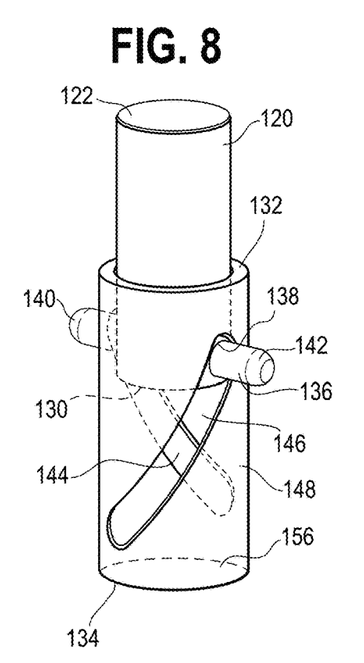
FIG. 8 shows an isometric view from above of the variable stator vane positioning device with a transparent housing shown in FIG. 6, with the interior spring removed.
Figure 9:
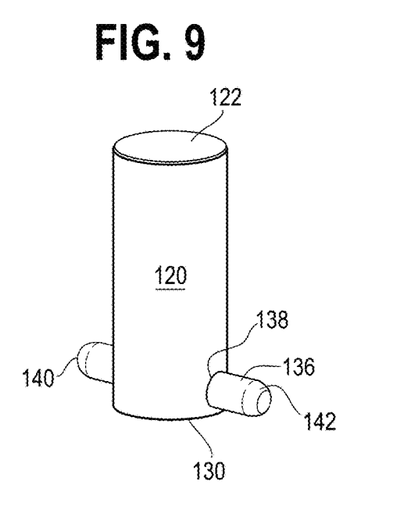
FIG. 9 shows an isometric view from above of an actuator arm having a pin extending therethrough that forms a part of the variable stator vane positioning device partially shown in FIGS. 6-8.

The actuator 118 is operably coupled to an interior vane control rod 120 on a first end 122 thereof, as shown in the illustrated example embodiment of FIGS. 5, 6, and 7. In response to the actuation of the actuator 118, the vane control rod 120 moves axially with respect to a sleeve 124 disposed about the vane control rod 120. As the vane control rod 120 moves axially within the sleeve 124, the vane control rod 120 will also move in and out of the actuator 118 and an actuator housing 126 disposed thereabout as shown in the example embodiment of FIG. 5.

The vane control rod 120 begins at a starting position 128 (FIGS. 5 and 6) wherein the first end 122 thereof is within the actuator housing 126 to the furthest extent such first end 122 penetrates the actuator housing 126 during normal operation. At the starting position 128, a second end 130 of the vane control rod 120 is at a position nearest to an actuator-proximal end 132 of the sleeve 124 proximal both the actuator 118 and actuator housing 126 and distal the stator 114.

As the vane control rod 120 is actuated upon by the actuator 118, both the first end 122 and the second end 130 of the vane control rod 120 move towards a stator-proximal end 134 of the sleeve 124 distal from the actuator 118 and actuator housing 126 and proximal the stator vane 114. When the actuator 120 reaches full stroke, the vane control rod 120 is fully extended in an extended position 129 (FIG. 7) such that the second end 130 is nearest both the stator vane 114 and the stator-proximal end 134 of the sleeve 124 distal from the actuator 118 and actuator housing 126. In alternative example embodiments, the actuator 120 may not be disposed within a housing and/or the vane control rod 120 may only travel outside of the actuator housing 126, if the starting position 128 of the vane control rod 120 is not within the actuator housing 126.

Referring now to FIGS. 5, 6, 7, 8, and 9, the variable stator vane positioning device 102 further comprises a guide pin 136 disposed within the vane control rod 120 and, in an example embodiment, extends through a guide pin through-hole 138 traversing the vane control rod 120 proximal the second end 130 thereof. First and second tips 140, 142 of the guide pin 136 protrude out of and away from the guide pin through-hole 138, thereby extending out of and away from the vane control rod 120. In an example embodiment, an axis of the guide pin 136 is perpendicular to an axis of the vane control rod 120. The first and second tips 140, 142 further extend into respective first and second sleeve tracks 144, 146. In an example embodiment, the guide pin 136 may be integral with the vane control rod 120 and/or may be welded or otherwise connected thereto.

The first and second sleeve tracks 144, 146 are disposed in a wall 148 of the sleeve 124. In the illustrated example embodiment, the sleeve tracks 144, 146 are slots cut through the sleeve wall 148 on opposing sides thereof. The guide pin 136 operably couples the vane control rod 120 to the sleeve 124 by contacting interior edges 150, 152 of the respective first and second sleeve tracks 144, 146 with the first and second tips 140, 142 of the guide pin 136.

According to this example embodiment, as the actuator 118 moves the vane control rod 120 through the sleeve 124, the guide pin tips 140, 142 cam against the interior edges 150, 152 of the respective first and second sleeve tracks 144, 146. The sleeve tracks 144, 146, as shown, may be arcuate and/or non-linear in shape. Alternatively, the sleeve tracks may be linear in shape and disposed at more or less severe angles respective an axis of the sleeve 124. The example embodiment shown throughout includes arcuate sleeve tracks 144, 146 that curve radially along the sleeve 124 from the actuator-proximal end 132 of the sleeve 124 to the stator-proximal end 134 thereof. In an alternative example embodiment, the sleeve tracks 144, 146 may have a curvature with one or more corresponding inflection points along an extent of the sleeve 124.

During extension of the vane control rod 120, because such rod does not rotate axially as the guide pin tips 140, 142 exert pressure against the interior edges 150, 152 of the sleeve tracks 144, 146, the sleeve 124 is forced to rotate about the axis. To keep the vane control rod 120 from rotating, such rod may pass through a fixed slot in the actuator housing or simply be fixedly secured to the actuator in a non-rotating fashion. FIG. 7 depicts the variable stator vane positioning device 102 from a perspective rotated to the right, as the non-rotating vane control rod 120 is shown from a different side thereof.

The speed and degree of rotation of the sleeve 124 is determined by the speed of extension of the vane control rod 120, which is controlled by the type and speed of the actuator 118, and the shape of the sleeve tracks 144, 146. More or less curvature of the sleeve tracks 144, 146 may provide more or less total rotation of the sleeve 124. Likewise, more or less severe curvature of the sleeve tracks 144, 146 and the relative location of the curvature therealong, may provide more or less rotation of the sleeve 124 at different degrees of extension of the vane control rod 120.

Referring once again to FIG. 5, the stator-proximal end 134 of the sleeve 124 is operatively coupled to the first end 110 of the stator vane 114. Therefore, rotation of the sleeve 124, as developed by actuation on the vane control rod 120, causes the stator vane 114 to rotate about the axis 115 thereof. Consequently, the position and/or angle of the stator vane 114 may be varied by the variable stator vane positioning device 102. In this way the position of the vane is manipulated by the variable stator vane positioning device/module 102.

Referring once again to FIGS. 6 and 7, the variable stator vane positioning device 102 further comprises a spring 154 disposed within the sleeve 124. The spring 154 is fixedly attached near the stator-proximal end 134 of the sleeve 124 to a base surface 156 of the sleeve 124 or any other suitable surface having sufficient structural integrity to resist forces placed on the spring 154. For example, the spring 154 may alternatively be anchored to a surface on the first end 110 of the stator vane 114 or a surface of the one or more engine components surrounding and supporting the stator vane 114, such as a stator casing 158 that surrounds the stator vane(s) and the other components of each compression stage. Further in accordance with example embodiments, the base surface 156 to which the spring 154 is operatively coupled may be independent of the sleeve 124 or otherwise stationary as compared with the sleeve 124. In such example embodiments, the spring 154 is held stationary on the base surface 156 while the sleeve 124 rotates about each of the base surface 156, spring 154, and the axis of the vane control rod 120.

As the vane control rod 120 is actuated upon and extends further through the sleeve 124, the second end 130 of the vane control rod 120 pushes against the spring 154 thereby compressing the spring 154 while moving from the starting position 128 to the extended position 129. The spring 154 may further be operatively coupled to the second end 130 of the vane control rod 120, such that when the rod 120 returns from the extended position 129 to the starting position 128 the spring 154 is drawn into a fully or partially uncompressed position by such attachment to the second end 130 of the rod 120.

Still further in an example embodiment, the spring 154 applies pressure against the second end 130 of the vane control rod 120 through all positions thereof. In this way, the spring 154 provides a stabilizing and damping function for the actuator 118 and the vane control rod 120. Specifically, as the vane control rod 120 descends through the sleeve 124, the spring provides a counter force, opposed to the direction of force of the actuator 118. Consequently, the spring 154 may assist in locking the vane control rod 120 into a particular position along the extension path thereof.

It may be desirable for the stator vane 114 to be held in a particular position so that the guide pin 136 is also held at a corresponding particular position and, by way of the guide pin 136, the sleeve 124 is held at still further corresponding particular position. As a result of the sleeve 124 being held in a particular position, the stator vane 114 is similarly held to a corresponding particular position, and thereby a desired angle of the individual stator vane 114 is maintained during the operation of the turbofan engine 108. Further to this point, the actuator 118 may receive linear position feedback derived from the location of the vane control rod 120 that is correlated to the angle of the stator vane 114. Therefore, a particular correlation is established between actuation on and extension of the vane control rod 120 and stator vane angle. Linear position feedback may be supplied by one or more sensors disposed about the actuator 118, vane control rod 120, sleeve 124, and/or stator vane 114.

The spring 154 may further operate to provide a safety function. According to an example embodiment, the spring 154 provides enough pressure against the second end 130 of the vane control rod 120 that in the case of stall or engine malfunction resulting in a loss of power to the actuator 118, the spring 154 forces the vane control rod 120 to the starting position 128. In this example embodiment, the sleeve position corresponding to the starting position 128 of the vane control rod 120 further corresponds to a fully open stator position desirable for decreasing pressure during compressor surge or stall.

Referring once again to FIG. 4, the variable stator vane positioning device 102 described hereinabove may be replicated for each individual stator vane 114 disposed radially about the fan shaft at a particular compression stage of a turbofan engine 108 to form the variable vane positioning system 100. A plurality of variable vane stator positioning devices/modules 160 arranged about a compressor stage and aligned with an associated plurality of stator vanes 114 may be synced together when forming the variable vane positioning system 100. Syncing the plurality of variable vane stator positioning devices/modules 160 may provide uniform rotation of the plurality of stator vanes 114 positionally controlled thereby. Additionally, the variable stator vane positioning device 102 described herein may be used to adjust vanes other than stator vanes in a turbine or other engine. For example the device/module 102 may be used to control turbofan fan blade positioning, turbofan stator positioning, heat exchange louvres, bleed doors for compressor stage bypassing, and/or butterfly valve applications. In accordance with these uses, the device/module 102 may once again be replicated for each individual vane component for which control is desired. Still further, syncing a plurality of the device(s)/module(s) 102 used to control one or more of the above-noted engine components may form one or more of the variable vane positioning system(s) 100 or a part thereof.

Further according to this example embodiment, the plurality of stator vanes 114 may be arbitrarily separated into smaller portions or sections such as, for example, quartered into four sections. According to such an example embodiment, each quarter section of the variable vane positioning system 100 may be individually synced and supplied with dedicated hydraulics. This example embodiment may provide desirable safeguards against hydraulic actuator failure as well as a relative decrease in time and expense for replacing a the hydraulic system should a failure of any quarter of the system 100 take place.

Strength and temperature tolerances for the components of the variable vane stator positioning device(s) 102 may be stage specific or customized to suit application to a particular compressor. For example, whether for cost, power, weight, or size efficiency reasons the actuators used at an early compression stage may not require the same force-producing specifications as actuators used during later, higher pressure compression stages of a turbofan engine 108. Further, such tolerances/specifications may be customized for different applications such as controlling turbofan fan blades and/or high or low pressure turbine stators/rotors.

Similarly, the shape and orientation of the sleeve tracks 144, 146 may be customized in order to accommodate the requirements of particular compressor stages, e.g. the tracks may develop more or less rotation in the stator vanes 114 controlled thereby in order to meet specific control and handling requirements for the particular compressor stage. Additionally, the operation of plural variable vane positioning systems 100, each controlling stators at different compressor stages, may be synchronized overall in order to comprise a full engine variable vane stator positioning system. Such an example full engine system may be controlled with an electronic controller, microcontroller, dedicated circuit, and/or other suitable control system.

INDUSTRIAL APPLICABILITY

In summary, the present disclosure contemplates a variable vane positioning system and/or a variable stator vane positioning device/module adaptable for use to control turbofan fan blade positioning, turbofan stator positioning, heat exchange louvres, bleed doors for compressor stage bypassing, and/or butterfly valve applications. The variable vane positioning system and/or device/module may accommodate application specific adaptations all while adhering to the general principles of the design disclosed herein. The system and device/module may be adapted for different turbofan engine configurations, sizes, and end-use applications, e.g. for an aircraft turbofan engine.

The variable stator vane positioning device/module may provide the ability to position a stator vane with relatively fewer component parts that introduce error in a conventional variable vane stator arrangement. Additionally, the variable vane stator system and device/module may increase accuracy for positioning and maintaining the position/angle of a stator and/or stator vanes. Further still, the utilization of a dedicated actuator for positioning each stator vane may reduce downtime, component, and labor costs associate with replacing a failing stator vane or variable stator vane positioning device/module.

In example embodiments, only a single variable stator vane positioning device/module need be removed for accessing a stator vane to facilitate replacement, while conventional variable vane stator arrangements instead require removal of a control/synchronization ring that is attached to each stator vane. Upon replacement of a single stator vane according to example embodiments of this disclosure, re-calibration is relatively easy and quick, in contrast with recalibration of the entire stator control/synchronization ring or ring system following removal and re-assembly of a single control/synchronization ring.

This disclosure further contemplates providing the advantage of more easily and efficiently varying the angles of the stator vanes non-proportionally such that the variable stator vanes in each stage are moved a proportion, or fraction, of the full angular displacement capability for each stator vane, but further that each variable stator vane is moved independent of the other variable stator vanes and perhaps according to a different proportion. This method improves efficiency and better adjusts compressor performance for surge or stall circumstances in axial flow compressors when the compressor rotor(s) operate at conditions of low rotational speeds.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure. Moreover, the embodiment(s) detailed hereinabove may be combined in full or in part, with any alternative embodiment(s) described.

We claim:

1. An apparatus for controlling a vane, the apparatus comprising:
    an actuator;
    a vane control rod;
    a guide pin disposed on the vane control rod;
    a sleeve disposed about the vane control rod; and
    a spring disposed within the sleeve;
    at least one sleeve track disposed along an extent of the sleeve;
    wherein the guide pin couples the vane control rod and the sleeve; and
    wherein the actuator linearly moves the vane control rod through the sleeve in order to manipulate a position of the vane and wherein the actuator applies a first force on the vane control rod and the spring provides a second force on the vane control rod opposite the actuator force.

2. The apparatus of claim 1, further comprising:
    first and second sleeve tracks disposed on opposing sides of the sleeve; and
    wherein each sleeve track penetrates a wall of the sleeve.

3. The apparatus of claim 2, wherein the guide pin extends from the vane control rod through the first and second sleeve tracks; and
    wherein the guide pin cams along the first and second sleeve tracks during linear actuation of the vane control rod.

4. The apparatus of claim 3, wherein the first and second sleeve tracks have a non-linear shape; and
    wherein manipulation of the position of the vane corresponds to a combination of the actuation of the vane control rod and the shape of the first and second sleeve tracks.

5. The apparatus of claim 3, wherein the actuator actuates on the vane control rod to move the vane control rod through the sleeve; and
    wherein as the vane control rod moves through the sleeve camming of the guide pin along the first and second sleeve tracks results in the sleeve rotating about the vane control rod.

6. The apparatus of claim 5, wherein the vane is a stator vane and the sleeve is coupled to the stator vane; and
    wherein manipulation of the position of the stator vane corresponds to rotation of the sleeve about the vane control rod.

7. The apparatus of claim 6, wherein the spring provides damping to the vane control rod; and
    wherein the vane control rod is held in position by a combination of the spring and the actuator.

8. The apparatus of claim 7, wherein the spring returns the vane control rod to a starting position in the event of engine failure; and
    wherein the starting position of the vane control rod corresponds to an open position of the stator vane.

9. A system for controlling a stator, the system comprising:

a plurality of variable stator vane positioning devices each comprising an actuator, a vane control rod, a sleeve associated with and disposed about the vane control rod, and a spring coupled to the vane control rod and disposed within the sleeve wherein an end of the control rod contacts an end of the spring;

wherein each vane control rod is coupled to its associated sleeve; and wherein each actuator moves the vane control rod through the sleeve in order to control a stator vane associated with the respective variable stator vane positioning device; and wherein each stator vane is individually controlled by the associated variable stator vane positioning device.

10. The system of claim 9, further comprising:
one or more sleeve tracks disposed on a wall of each sleeve; and
wherein each sleeve is coupled to the stator vane associated therewith.

11. The system of claim 10, wherein a guide pin couples each vane control rod to each respective sleeve;
wherein each vane control rod travels through the sleeve associated therewith upon actuation of the associated actuator; and
wherein an angle of each of the stator vanes is controlled by a combination of the associated control rod and sleeve.

12. The system of claim 11, wherein synchronized control of the stator is provided by manipulation of each of the stator vanes resulting from actuation on the vane control rod associated with each of the stator vanes.

13. The system of claim 9,
wherein the plurality of variable vane positioning devices is disposed about the stator; and
wherein, in response to one of compressor surge or compressor stall, the stator is placed into a fully open position by each of the springs acting on each of the associated vane control rods to return each of the stator vanes to an open position.

14. A system for controlling a compressor, the system comprising:
a plurality of variable stator vane positioning modules wherein each module comprises an actuator, a vane control rod, and a sleeve disposed about the vane control rod wherein a spring is disposed in the sleeve; and wherein the sleeve has one or more sleeve tracks disposed therealong wherein the one or more sleeve tracks disposed along each of the sleeves are arcuate in shape; and wherein the vane control rod is coupled to the sleeve by a pin extending through both the vane control rod and the one or more sleeve tracks so that the sleeve rotates about the vane control rod in response to actuation of the vane control rod;

a plurality of variable stator vane positioning modules disposed about each stator of a plurality of stators;

wherein stator characteristics are determined by each of the variable stator vane positioning modules changing a position of a stator vane coupled thereto; and wherein compressor operation is controlled by the combined stator characteristics of the plurality of stators.

15. The system of claim 14, wherein the position of each of the stator vanes is determined in part by the associated vane control rod and the associated one or more sleeve tracks.

16. The system of claim 14, wherein the one or more sleeve tracks disposed along each of the sleeves differ in shape from one variable stator vane positioning module of the plurality to another variable stator vane positioning module of the plurality.

17. The system of claim 14, wherein a shape of the one or more sleeve tracks provides customizable control of each of the stators of the plurality of stators.

18. The system of claim 14, wherein the spring provides control over compressor operation during a compressor surge or compressor stall event.

* * * * *